US010634122B1

(12) United States Patent
Clifton et al.

(10) Patent No.: US 10,634,122 B1
(45) Date of Patent: Apr. 28, 2020

(54) PORTABLE MONOPOLE TOWER WITH ADJUSTABLE FOUNDATION

(71) Applicant: ARE Telecom Incorporated, St. Paul, MN (US)

(72) Inventors: Michael Clifton, Flagstaff, AZ (US); Dion Johnson, St. Paul, MN (US)

(73) Assignee: ARE TELECOM INCORPORATED, St. Paul, MN (US)

( * ) Notice: Subject to any disclaimer, the term of this patent is extended or adjusted under 35 U.S.C. 154(b) by 0 days.

(21) Appl. No.: 16/271,406

(22) Filed: Feb. 8, 2019

(51) Int. Cl.
| | | |
|---|---|---|
| *E02D 27/42* | (2006.01) |
| *E04H 12/18* | (2006.01) |
| *F03D 13/20* | (2016.01) |
| *E04H 12/34* | (2006.01) |
| *H02S 10/12* | (2014.01) |
| *H02S 30/10* | (2014.01) |
| *H02S 10/20* | (2014.01) |
| *H01Q 1/12* | (2006.01) |
| *F03D 9/11* | (2016.01) |
| *F03D 9/00* | (2016.01) |

(52) U.S. Cl.
CPC ............ *F03D 13/22* (2016.05); *E04H 12/345* (2013.01); *H02S 10/12* (2014.12); *H02S 10/20* (2014.12); *H02S 30/10* (2014.12); *E02D 27/42* (2013.01); *F03D 9/007* (2013.01); *F03D 9/11* (2016.05); *H01Q 1/1228* (2013.01)

(58) Field of Classification Search
CPC .......... F03D 13/22; F03D 13/10; F03D 13/20; F03D 9/10; F03D 9/007; E04H 12/345; E04H 12/20; E04H 12/10; H01Q 1/1228; H01Q 1/1235; H01Q 1/1242; E02D 27/42; E02D 27/425; H02S 10/12; Y02E 10/728

USPC ..................... 52/116, 146; 343/882
See application file for complete search history.

(56) References Cited

U.S. PATENT DOCUMENTS

| | | | | | |
|---|---|---|---|---|---|
| 2,213,870 | A | * | 9/1940 | Scholl | E04H 12/187 52/117 |
| 2,446,949 | A | * | 8/1948 | Neutra | E04H 9/021 52/292 |
| 2,474,250 | A | * | 6/1949 | Howard | F16M 11/08 52/114 |
| 3,028,595 | A | * | 4/1962 | Cole | H01Q 25/00 342/359 |
| 3,059,883 | A | * | 10/1962 | Matthiessen | H02G 3/22 248/49 |
| 3,561,711 | A | * | 2/1971 | Dodge | E04H 12/10 248/163.1 |
| 3,920,212 | A | * | 11/1975 | Westwood | B66F 13/00 248/346.01 |

(Continued)

*Primary Examiner* — Kyle J. Walraed-Sullivan
(74) *Attorney, Agent, or Firm* — Westman, Champlin & Koehler, P.A.

(57) ABSTRACT

A modular foundation includes a central portion and a plurality of legs non-rotatably secured to and extending from the central portion. The plurality of legs are substantially equally spaced apart from each other wherein each leg includes a proximal end and a distal end. A ballast support adapter is attached to the distal end of each leg wherein the adapter is configured to support one or more ballast plates such that each leg can be independently positioned for leveling the foundation and supporting the monopole in a vertical position. A platform supports the monopole and is pivotally attached to the central portion wherein the platform is configured to move from a vertical position to a horizontal position.

19 Claims, 10 Drawing Sheets

(56) References Cited

U.S. PATENT DOCUMENTS

| | | | | |
|---|---|---|---|---|
| 3,937,434 A * | 2/1976 | Tacke | A47C 7/004 | 248/188.7 |
| 3,948,482 A * | 4/1976 | Brophy | B66F 3/00 | 254/4 R |
| 4,185,288 A * | 1/1980 | Dosch | H01Q 1/1235 | 343/713 |
| 4,197,056 A * | 4/1980 | Hutter | F03D 1/02 | 416/132 B |
| 4,220,981 A * | 9/1980 | Koether | B60P 3/18 | 362/238 |
| 4,590,718 A * | 5/1986 | Angeloff | E04H 12/187 | 52/116 |
| 5,094,567 A * | 3/1992 | Nista | E21B 43/01 | 405/227 |
| 5,236,167 A * | 8/1993 | Tai | A47G 33/12 | 206/423 |
| 5,290,004 A * | 3/1994 | Frost | A47G 33/12 | 248/188.7 |
| 5,363,116 A * | 11/1994 | Allen | H01Q 1/1235 | 248/170 |
| D359,272 S * | 6/1995 | Fahy | D14/238 | |
| D362,854 S * | 10/1995 | Fahy | D14/238 | |
| 5,531,419 A * | 7/1996 | Gustafsson | E04H 12/187 | 248/519 |
| 5,576,722 A * | 11/1996 | Bustillos | H01Q 1/1235 | 248/170 |
| 5,832,688 A * | 11/1998 | Crissey | E04H 12/10 | 52/651.01 |
| 5,899,422 A * | 5/1999 | Eke | A47C 3/38 | 108/144.11 |
| 6,229,497 B1 * | 5/2001 | McCracken | H01Q 1/12 | 343/878 |
| 6,390,435 B1 * | 5/2002 | Gustafsson | E04H 12/20 | 248/519 |
| 6,462,718 B1 * | 10/2002 | Ehrenberg | H01Q 1/1235 | 343/757 |
| 6,464,196 B1 * | 10/2002 | Crookham | E04G 1/24 | 248/519 |
| 6,572,061 B2 * | 6/2003 | Overbeck | A47C 4/20 | 248/163.1 |
| 6,630,912 B2 * | 10/2003 | Ehrenberg | H01Q 1/1207 | 343/757 |
| 6,655,097 B1 * | 12/2003 | Poolaw | E04G 21/26 | 248/188.1 |
| 7,077,369 B2 * | 7/2006 | Hardin | F16M 11/36 | 16/19 |
| 7,089,705 B1 * | 8/2006 | Lieberman | E04H 12/187 | 248/670 |
| 7,374,149 B1 * | 5/2008 | Dacey | G02B 6/48 | 254/134 |
| 7,642,987 B2 * | 1/2010 | Newman | E04H 12/182 | 343/874 |
| 7,984,789 B2 * | 7/2011 | Michalec | A01M 31/02 | 182/115 |
| 8,172,438 B2 * | 5/2012 | Konop | B60P 3/18 | 362/192 |
| 8,269,690 B1 * | 9/2012 | Caruso | H01Q 1/246 | 343/890 |
| 8,662,792 B2 * | 3/2014 | Achard | E02D 27/52 | 405/224 |
| 8,931,932 B2 * | 1/2015 | Lipscomb | F21V 31/03 | 362/362 |
| 2002/0135531 A1 * | 9/2002 | Ehrenberg | H01Q 1/12 | 343/878 |
| 2002/0179788 A1 * | 12/2002 | Crookham | E04G 1/24 | 248/188 |
| 2006/0165493 A1 * | 7/2006 | Nim | B63B 35/44 | 405/223.1 |
| 2007/0247381 A1 * | 10/2007 | Runte | H01Q 1/52 | 343/720 |
| 2008/0236073 A1 * | 10/2008 | Bagepalli | F03D 80/82 | 52/292 |
| 2009/0109122 A1 * | 4/2009 | Gonzalez | H01Q 1/084 | 343/915 |
| 2011/0037264 A1 * | 2/2011 | Roddier | F03D 13/25 | 290/44 |
| 2011/0061321 A1 * | 3/2011 | Phuly | E02D 27/42 | 52/297 |
| 2011/0142682 A1 * | 6/2011 | Gevers | F03D 13/10 | 416/244 R |
| 2011/0155038 A1 * | 6/2011 | Jahnig | F03D 13/22 | 114/264 |
| 2011/0206467 A1 * | 8/2011 | Achard | F03B 11/00 | 405/224 |
| 2011/0296908 A1 * | 12/2011 | Kjerstad | G01V 3/15 | 73/170.29 |
| 2012/0047830 A1 * | 3/2012 | Phuly | E02D 27/42 | 52/294 |
| 2012/0068039 A1 * | 3/2012 | Erich | E02D 27/00 | 248/519 |
| 2012/0167499 A1 * | 7/2012 | Knisel | F03D 13/22 | 52/231 |
| 2012/0228442 A1 * | 9/2012 | Clifton | F24S 25/10 | 248/163.1 |
| 2013/0227898 A1 * | 9/2013 | Fairbairn | E02D 27/42 | 52/169.9 |
| 2014/0125134 A1 * | 5/2014 | Van Straten | F03D 13/20 | 307/72 |
| 2014/0285005 A1 * | 9/2014 | Casteel | H02S 10/20 | 307/23 |
| 2015/0159337 A1 * | 6/2015 | Kellner | E04H 17/22 | 248/156 |
| 2015/0159802 A1 * | 6/2015 | Johnson | E04H 12/2238 | 248/165 |
| 2015/0240442 A1 * | 8/2015 | Garcia-Valdecasas Bernal | E02D 27/10 | 405/208 |
| 2015/0308140 A1 * | 10/2015 | Clifton | F03D 9/007 | 248/346.2 |
| 2015/0376857 A1 * | 12/2015 | Clifton | E02D 27/42 | 52/292 |
| 2016/0075413 A1 * | 3/2016 | Nebrera Garcia | E02D 27/42 | 114/122 |
| 2016/0230365 A1 * | 8/2016 | Shi | E02D 27/42 | |
| 2017/0030045 A1 * | 2/2017 | Krause | E02D 27/425 | |
| 2017/0122490 A1 * | 5/2017 | Verstrate | H01Q 1/1228 | |
| 2017/0190391 A1 * | 7/2017 | Siegfriedsen | B63B 21/50 | |
| 2018/0030963 A1 * | 2/2018 | Viselli | B63B 1/107 | |
| 2018/0283032 A1 * | 10/2018 | Harmer | E04H 12/20 | |
| 2019/0093382 A1 * | 3/2019 | Sauber | E04H 12/345 | |
| 2019/0177995 A1 * | 6/2019 | Klause | E02D 27/425 | |
| 2019/0226174 A1 * | 7/2019 | Schuldt | E02D 27/425 | |
| 2019/0292804 A1 * | 9/2019 | Kensinger | E04H 12/182 | |

* cited by examiner

PORTABLE MONOPOLE TOWER WITH ADJUSTABLE FOUNDATION

BACKGROUND

The present invention relates to a foundation and raising system for a monopole tower. More particularly, the present invention relates to a portable, modular monopole having an adjustable foundation and raising system for a monopole tower that can support one of a number of pieces of equipment including wind turbines, solar panels, street lights, communication devices, monitoring systems where the system can be stored and transported in a disassembled state and assembled on site and leveled on uneven terrain and stabilized with weight.

Monopole towers are becoming increasingly utilized in numerous industries including, for instance, renewable wind energy and solar energy. Monopole towers are also utilized in the satellite and wireless communication industries. Monopole towers provide the necessary structural support to maintain equipment in an elevated position. Typical equipment supported by monopole towers include wind turbines, typically 100 kW and smaller, solar panels or antennae. Monopole towers also require less capital expenditure when compared to a typical support structure. Monopole towers can also be utilized to support meteorological equipment such as an anemometer, wind direction vanes, temperature sensors and pressure sensors. Monopole towers can also be utilized to support streetlights or any other industry where an elevated lighting source is required, such as the construction industry.

Typically, monopole towers are secured to concrete foundations having footings buried into the ground. Concrete foundations are typically expensive to construct and often times require a construction permit. Once constructed, the foundation cannot be moved. Therefore, if a location for a monopole tower location is abandoned or becomes obsolete, the foundation either is removed at a substantial cost or abandoned in the location, becoming a potential hazard.

Many monopole tower constructions require a substantially flat surface area for set-up. For instance, an area may need to be leveled using earth moving equipment before setting up the foundation so as to provide a stable support for the foundation. The present disclosure includes a modular portable adjustable foundation and raising device to conveniently raise and lower the monopole tower and the attached equipment.

SUMMARY

A first aspect of the present disclosure includes a monopole foundation. The foundation has a central portion having a platform for pivotally supporting the monopole tower thereon and a plurality of legs where each leg secured to and extending from the central base portion. Each leg includes a proximal end and a distal end. Arms are each attached to the distal end of each leg and each arm is configured to independently support ballast. The ballast are plates that can be secured to each arm in one of a first position on top of the arm, and a second position below the arm. The ballast stabilizes the monopole foundation in a level position on a ground surface. Each arm is configured with a first ballast mounting plate and a second ballast mounting plate, the plates being spaced apart and supported by the arm and each plate having an aperture for securing ballast plates thereto.

The ballast plates are configured to be stackable plates where each ballast plate has opposing first and second surfaces. The first surface of a first plate nests within the second surface of a second plate for substantially flush stacking of two or more ballast plates.

Another aspect of the present disclosure includes a frame secured to the central portion of the foundation for supporting one or more solar panels.

The monopole tower may support a communications system thereon and further comprise a wind turbine for capturing renewable energy, which may be stored in batteries supported on the foundation.

Yet another aspect of the present disclosure includes a device configured to retain equipment in a leveled and elevated position. The device includes the foundation having a central portion and the plurality of legs, each leg secured to and extending from the central portion wherein each leg includes a proximal end and a distal end. The device includes the plurality of arms, wherein each arm is attached to the distal end of each leg, and where each arm is configured to independently support one or more ballast plates. The device also has a platform pivotally attached to the central portion wherein the platform is configured to move from a vertical position to a horizontal position and a monopole tower having a bottom end and a top end wherein the bottom end of the monopole tower attaches to the platform and the top end is configured to retain the equipment. The equipment includes a renewable energy capture device and a communications system with one or more antennas.

The arms each have a mounting plate configured to be coupled to the arm to the distal end of the leg; an upper ballast support plate and a lower ballast support plate, each support plate having a plurality of securing apertures therein; and a tubular arm extending from the mounting plate to the upper and lower ballast support plates.

The monopole can be a multi-section monopole that can be assembled on-site.

The device further includes a lifting mechanism having a top end attached to the platform and a bottom end attached to the central portion wherein the lifting mechanism is manipulated to pivotally move the platform from the vertical position to the horizontal position.

DETAILED DESCRIPTION

Figure 1:
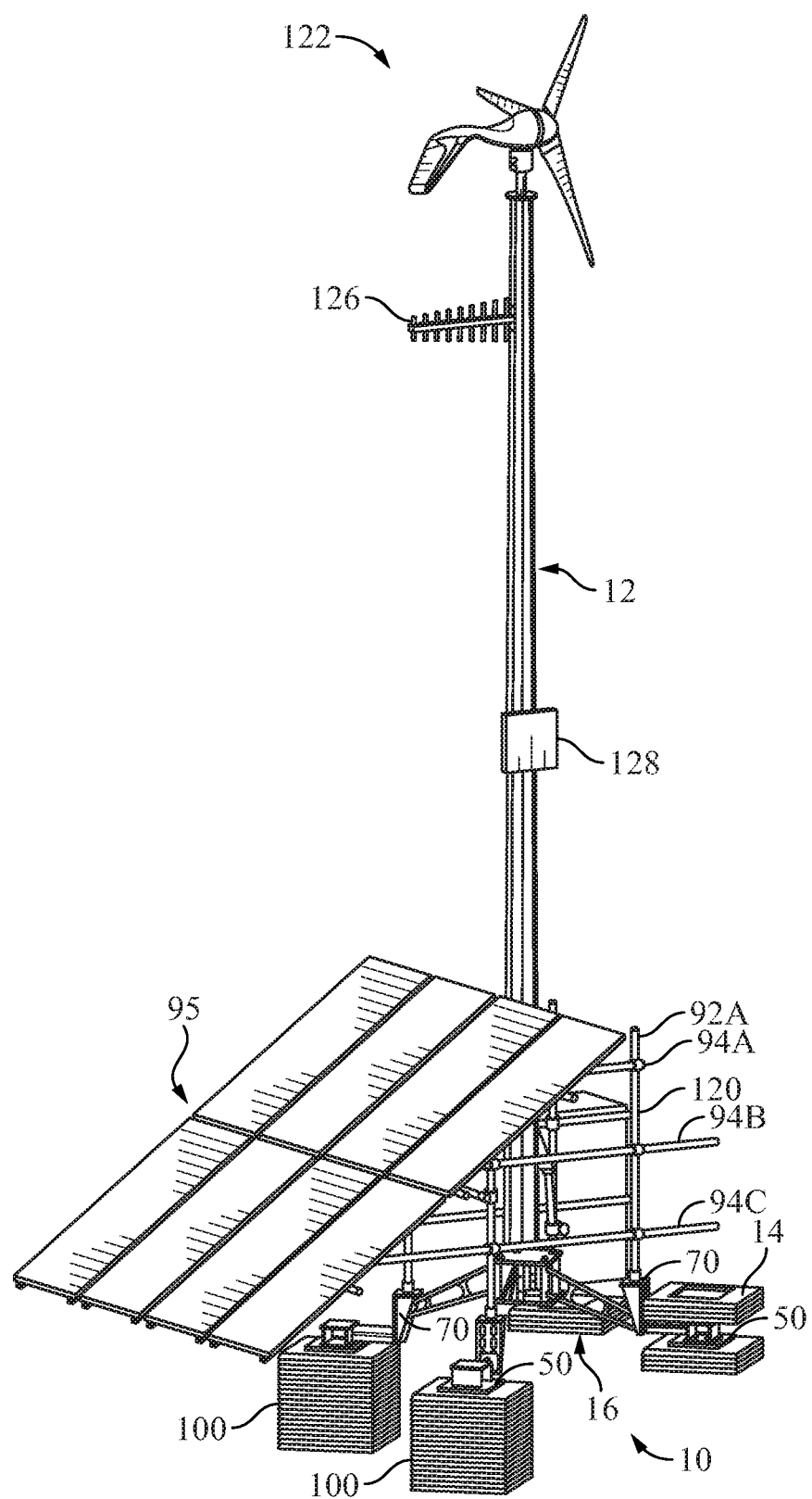
FIG. 1 is a perspective view of a foundation a monopole tower in a raised configuration.
Figure 2:
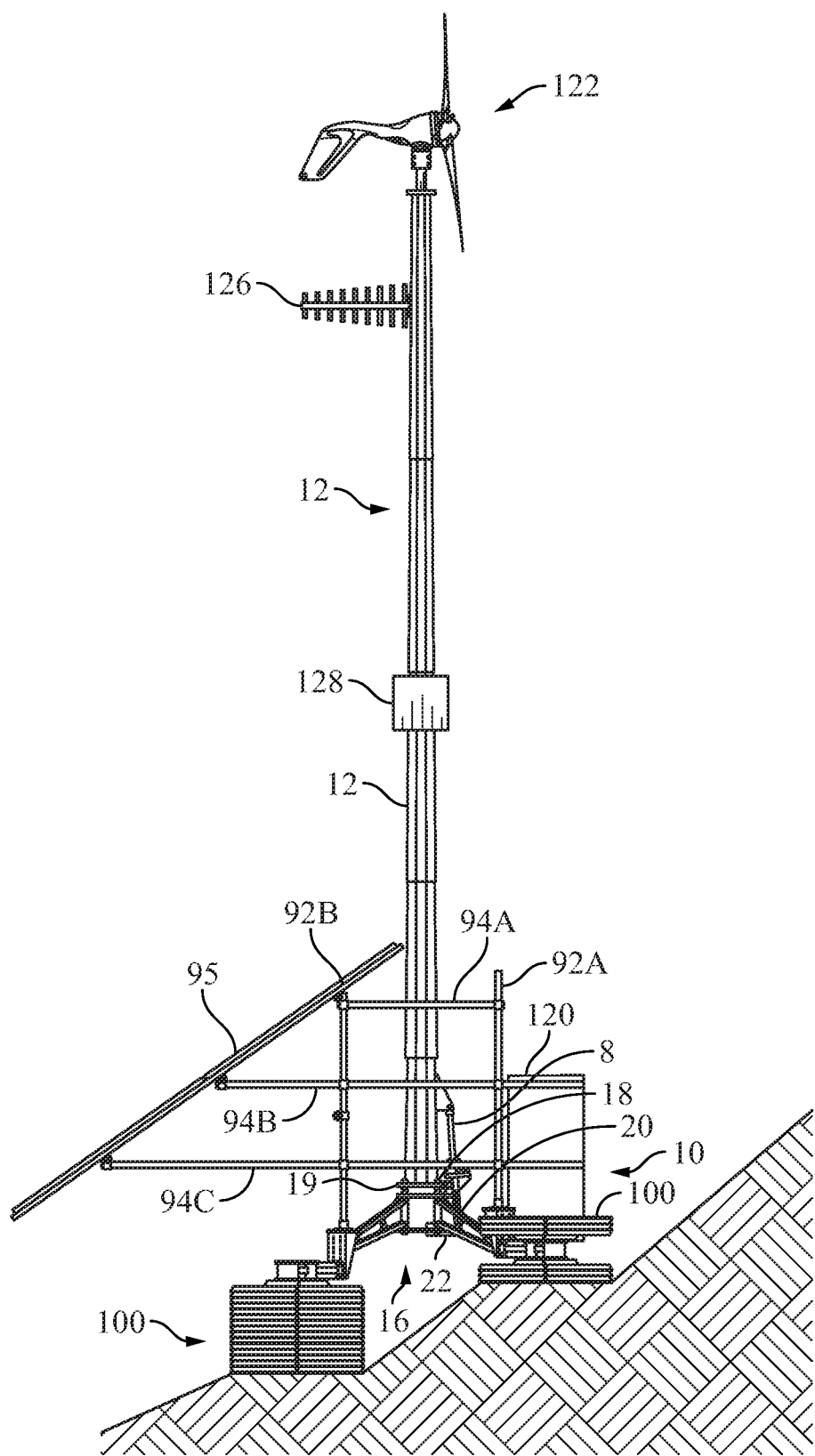
FIG. 2 is a side view of the foundation leveled on an uneven surface and the monopole tower in the raised configuration.

A portable and adjustable foundation for supporting, elevating and lowering a monopole tower 12 is generally illustrated in FIGS. 1-2 at 10. The monopole tower 12 is pivotally attached to the foundation 10 and is raised and lowered with a lifting mechanism 8. The lifting mechanism 8 may be a jack, however, other raising and lowering mechanisms are also contemplated. The foundation 10 is adjustable such that the foundation 10 can be levelled on an uneven surface using ballast 14 that is also provided for stabilizing the foundation 10 and monopole tower 12.

The foundation 10, monopole 12, and ballast 14 can be transported in a compact, disassembled state. The design of the foundation 10 also allows the components to be assembled with standard tools. The design of the foundation 10 therefore allows for compact packing for travel and storage, and also allows the foundation 10 to be easily assembled in a short amount of time. The foundation 10 provides increased convenience and accessibility to the use of monopole towers 12 in remote locations and in diverse terrain.

Similarly, the monopole 12 can be a multi-section monopole. For example, the monopole illustrated in the figures is a five-section monopole. The interlocking sectional design of the monopole 12 also allows for compact packing of the pole sections for travel and/or storage, and also allows the monopole 12 to be easily assembled in a short amount of time. Five sections are exemplary in nature, however two, three, or more sections are contemplated and any number of sections for forming the monopole are within the scope of this disclosure.

The foundation 10 includes a central portion 16 having an upper plate 18 and a lower plate 19 that are spaced apart by proximal ends 22 of legs 20. Four legs 20 are typically utilized and are evenly spaced apart around the central portion 16. While four or more legs 20 are typical, three or more legs 20 are contemplated.

Figure 3:
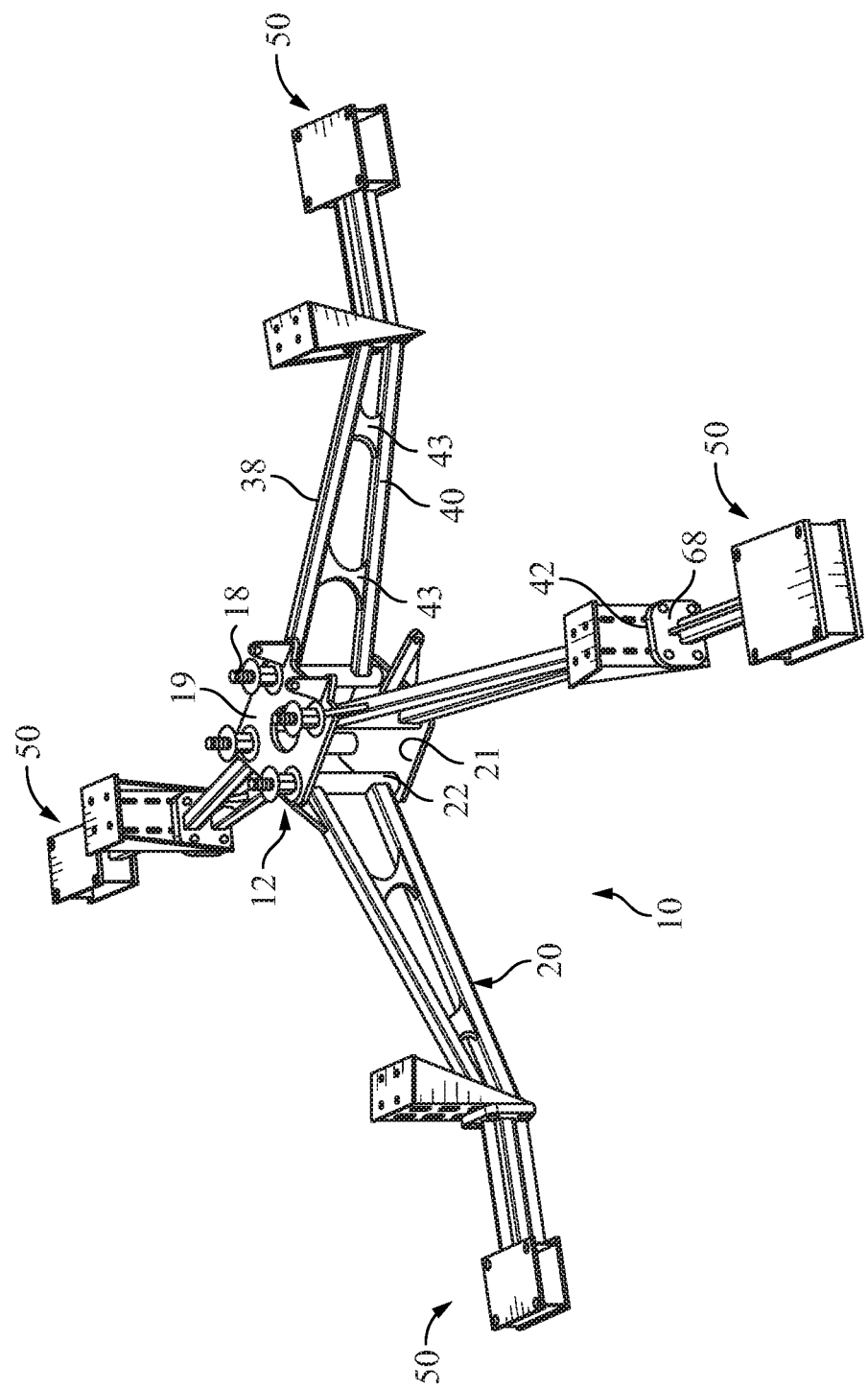
FIG. 3 is a perspective view of the foundation.
Figure 4:
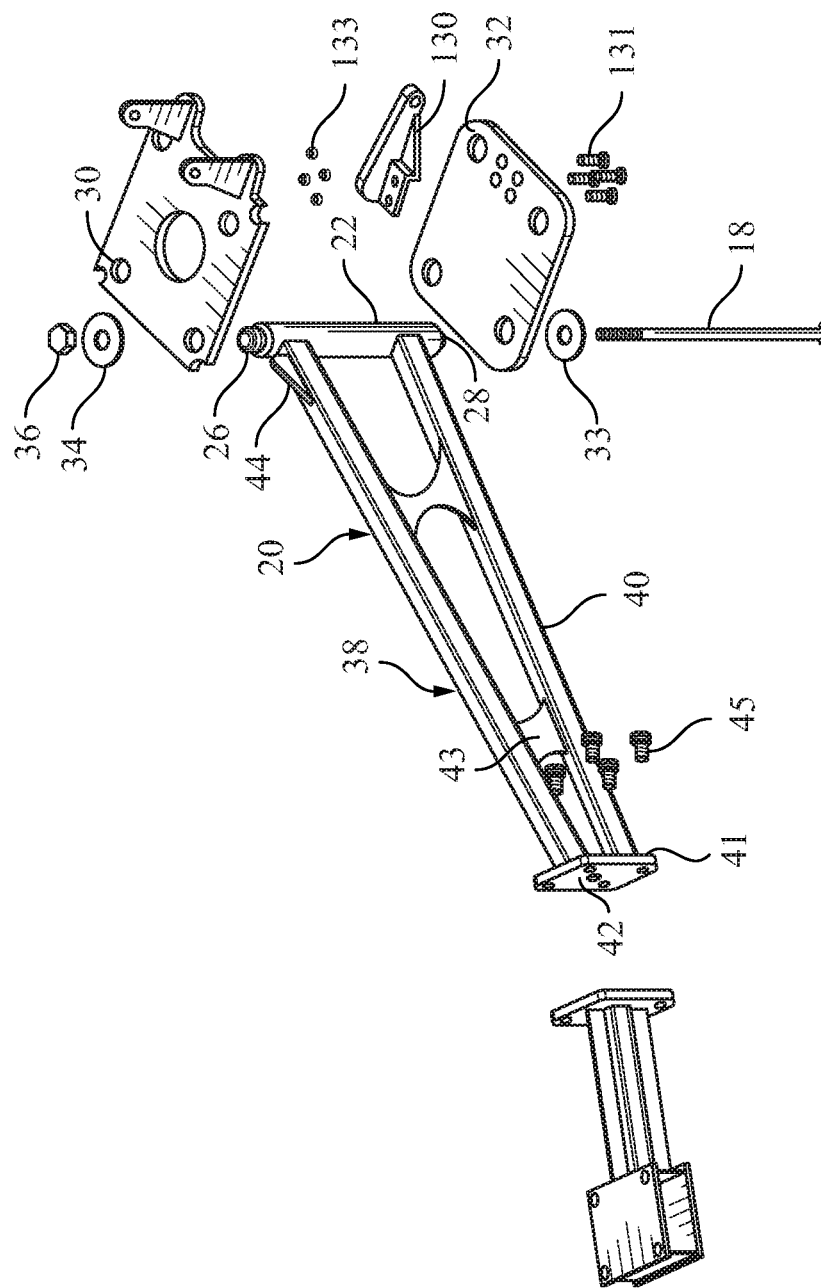
FIG. 4 is a partial exploded view of a leg of the foundation and a central portion of the foundation.

As illustrated in FIGS. 3-4, each leg 20, which are similarly constructed, includes a tubular portion 24 at the proximal end 22 having upper and lower bosses 26 and 28 that secure within an upper aperture 30 in the upper plate 19 and a lower aperture 32 in the lower plate 21, respectively. A securing mechanism 18, such as a bolt 18 is positioned through a through bore 25 in the tubular portion 24 where the bolt 18 extends through the top edge of the upper boss 26. A washer 33 typically separates the head of the bolt from a bottom surface of the lower plate 18. A flat washer 34 and a nut 36 secure the bosses 26 and 28 within the apertures 30 and 32, respectively. Utilizing bosses 26 and 28 provides for positive locking of the tubular portion 24 to the plates 18 and 19 while preventing bolt sheer. While the embodiment illustrated comprises four legs 20, three or more legs 20 can be incorporated and are within the scope of this disclosure.

The leg 20 includes an upper bar 38 and a lower bar 40 that are attached to the tubular portion 24 proximate the upper and lower bosses 26 and 28, respectively. The upper bar 38 and the lower bar 40 attach to a mounting plate 42 at a distal end 41 of the leg 20 where the distance between the upper bar 28 and the lower bar 40 gradually converges such that the upper bar 38 is at a steeper angle than the lower bar 40. The upper and lower bars 38 and 40 are reinforced by intermediate bracing plates 43 which prevent the bars 38 and 40 from bending or bowing when supporting the monopole 8 and a piece of equipment.

A tab 44 extending from the upper bar 38 is positioned within a slot 46 in the upper plate 18 where the engagement of the tab 44 with the slot 46 prevents rotation of the leg 20 about the bolt and therefore retains the leg 20 in a fixed position relative to the central portion 12. The slots 46 are typically located ninety degrees apart from each other on the upper plate 18 for a four leg foundation 10. However, the location of the slots 46 and apertures 30 and 32 will vary depending on the number of legs 20 utilized in the foundation 10.

Figure 5A:
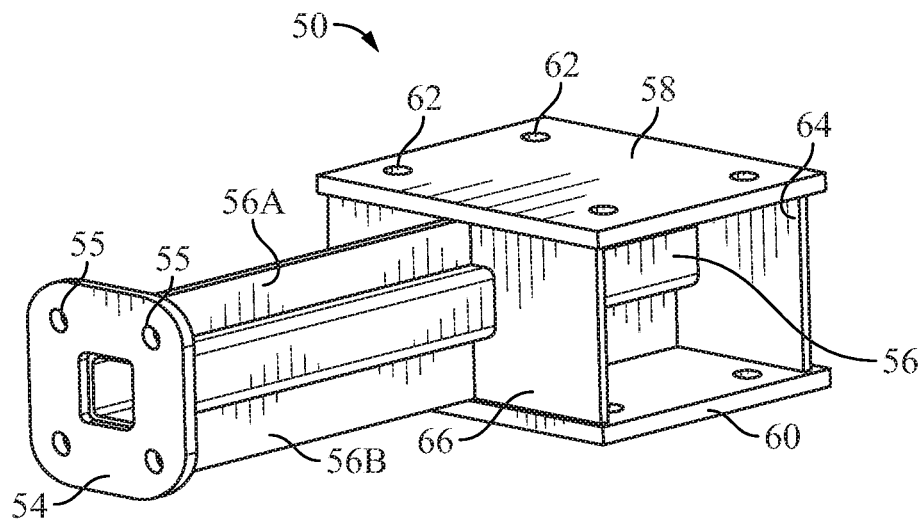
FIG. 5A is a rear perspective view of a ballast support adapter for an arm of the foundation.
Figure 5B:
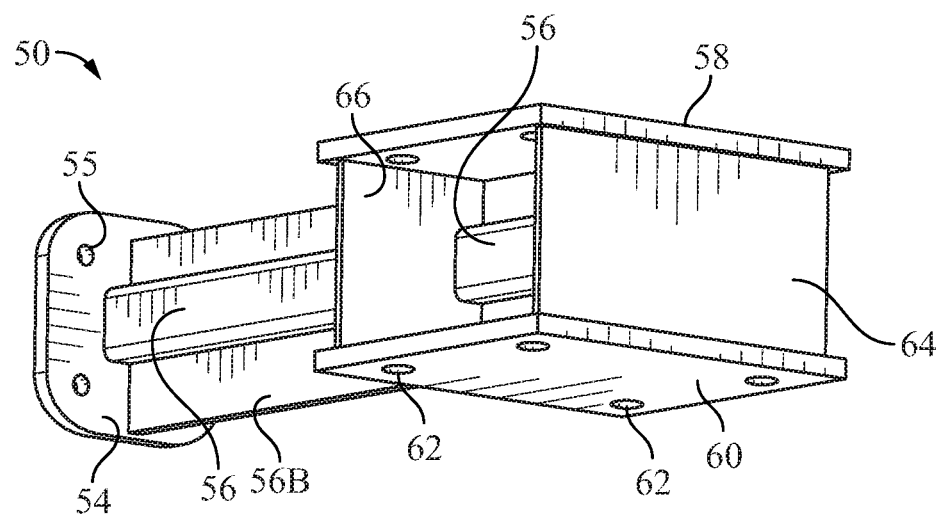
FIG. 5B is a front perspective view of the ballast support adapter for the arm of the foundation.

Referring to FIGS. 5A and 5B a ballast support adapter 50 is configured to be attached to the distal end 41 of each leg 20. The ballast support adapter 50 is typically constructed from a sheet of metal that is stamped and bent to form the desired configuration of the ballast support adapter 50. However, the ballast support adapter 50 could also be formed by attaching desired portions to each other, such as but not limited to, with a weld.

The ballast support adapter 50 includes a lower plate 52 having apertures 54 and an upper plate 56 having apertures 58 therein. Front and rear side walls 60 and 62 extend upwardly from the bottom plate 52 to the top plate 56 and the front side wall 60 has an opening 63 that accepts a mounting bar 64. The mounting bar 64 has flat surfaces that engage flat surfaces on the aligned opening 63 to prevent the mounting bar 64 from rotating with respect to the ballast support adapter 50. The mounting bar 64 thus extends through the front side wall 60 and between the lower and upper plates 52 and 56. The lower and upper plates 52 and 56 are substantially flat plates that are positioned in a plane parallel to the length of the mounting bar 64. Proximal end 66 of the mounting bar 64 has a mounting bracket 68 that is securable to the mounting bracket 42 at the distal end 41 of the leg 20. A threaded engagement utilizing bolts 45 is typically utilized to secure the mounting brackets 68 and 23 together such that the ballast support adapter 50 is non-rotatably and securely attachable to the leg 20, however other securing mechanisms are contemplated and within the scope of this disclosure.

As discussed in further detail below, ballast can be secured below the ballast support adapter 50 by connection with the lower plate 52 independently on each of the plurality of legs 20 of the foundation 10 to level the foundation. Ballast can be secured on top of the ballast support adapter 50 by connection with the upper plate 26 to further stabilize the foundation 10 and the monopole tower 12.

Figure 6C:
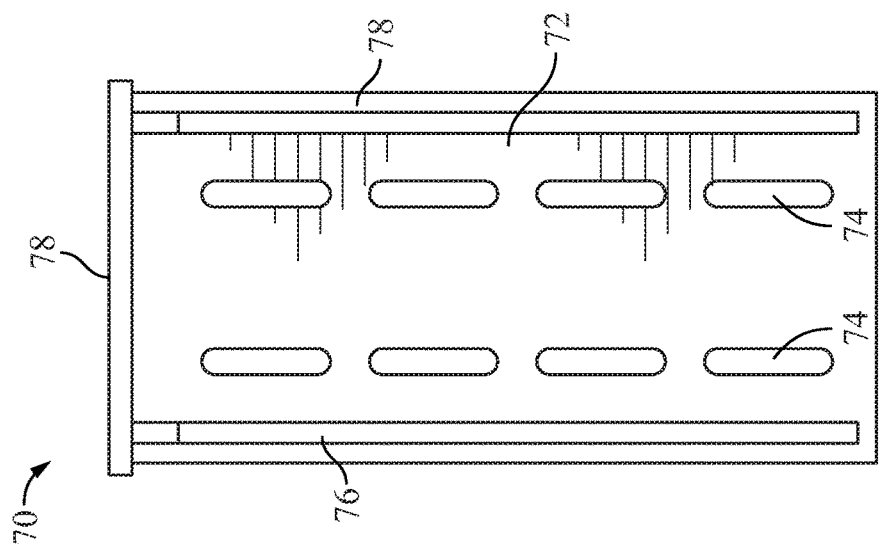
FIG. 6C is a rear view of the connector for the ballast support adapter.
Figure 6B:
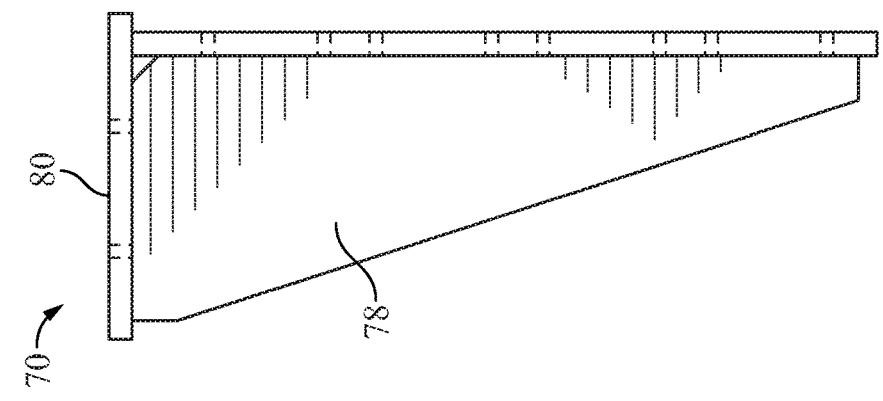
FIG. 6B is a side view of the connector for the ballast support adapter.
Figure 6A:
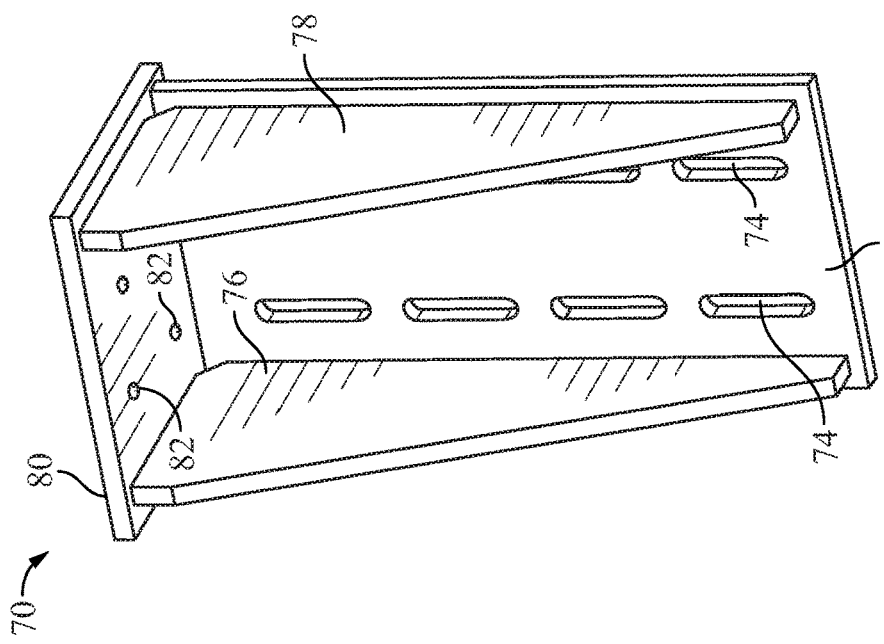
FIG. 6A is a front perspective view of a connector for a ballast support adapter.

Also securable to the mounting bracket 42 is an adapter plate 70 as illustrated in FIGS. 6A-6C. The adapter plate 70 can be secured to the foundation 10 between the mounting bracket 42 of the leg 20 and the mounting bracket 68 of the ballast support adapter 50. The adapter plate 70 allows for the securing of a frame 90 to the foundation 10, where this frame 90 may support one or more solar panels 95 on the foundation 10. The adapter plate 70 includes a back wall 72 having one or more pairs of apertures 74, where the apertures 74 have elongated lengths. Left and right side walls 76 and 78 are tapered side walls 76 and 78 extending along and attached to right and left edges of the back wall 72. The tapered side walls 76 and 78 are positioned such that an end of each side wall having a greatest depth is attached to a bottom surface of a top wall 80 and support the top wall 80 thereon. The tapered side walls 76 and 78 provide strength to the plate 70 and support the top wall 80 thus preventing the top wall 80 from bending under the weight of support frame 90 and solar panels secured thereto. The top wall 80 may have one or more apertures 82 therein. The apertures 82 allow for the connection of the support frame 90 to the adapter plate 70 for mounting on the foundation 10.

The ballast support adapter 50 and adapter plate 70 together allow for numerous orientations for securing and leveling the foundation 10 and supporting the monopole tower 12 on various terrain, including uneven terrain. The ballast support adapter 50 can move vertically with respect to its attachment with the respective leg 20, which allows for better leveling of the foundation 10 when used on uneven terrain. For example, the ballast support adapter 50 can be mounted at various locations with respect to the corresponding leg 20 via securing the apertures 55 on the ballast support adapter 50 to any one of the various pairs of spaced apart apertures 74 in the mounting plate 70 when the mounting plate 70 is secured between the ballast support adapter mounting bracket 54 and the mounting bracket 42 at the distal end 41 of the leg 20.

Figure 7:
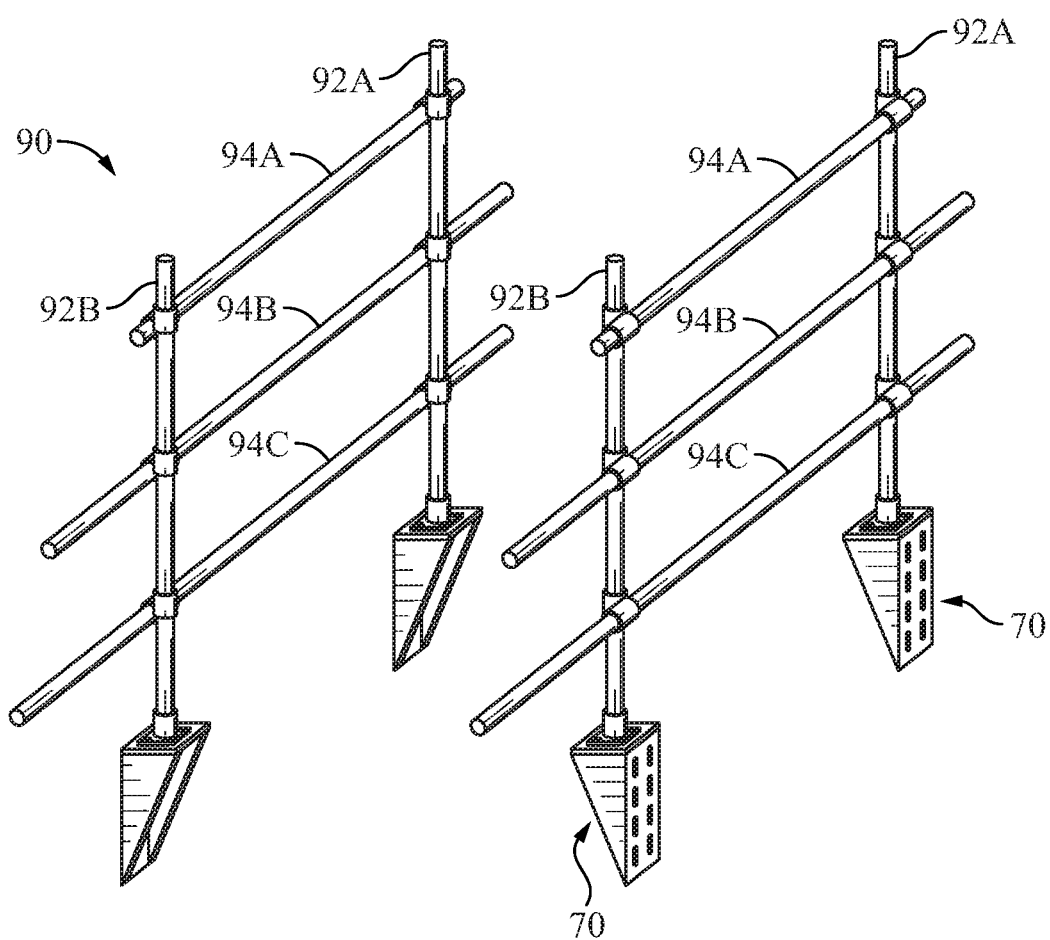
FIG. 7 is a perspective view of a frame for mounting on the foundation and for supporting renewal energy capture devices.

As illustrated in FIG. 7, an exemplary support frame 90 has a tubular framework comprising a plurality of interconnected tubes or rods 92 and 94. The frame 90 can be assembled on site for ease in transport. At least some of the rods are first rods 92 and the rods 92 have substantially the same length. At least some of the rods 94 are second rods 94 and the rods 94 have varying lengths.

In the embodiment illustrated, the respective rods 92 and 94 are substantially vertical rods 92 and substantially horizontal rods 94 with respect to a ground surface when the foundation 10 is installed and substantially leveled with respect to said ground surface. In the embodiment illustrated in the figures, the rods 92A and 92B are secured in a generally upright manner to the top of each top wall 80 secured to the foundation 10 to provide a perimeter to the frame 90. The rods 92A and 92B are secured using bolts, screws, clips or other suitable fasteners. The rods 94A, 94B, and 94C are then positioned in a generally horizontal manner and are spaced apart along a length of two adjacent rods 92A and 92B and secured thereto. The horizontal rods 94A, 9B, and 94C are secured to the vertical rods 92A and 92B at one or more connection points 93 via clips, ties, or other suitable fasteners. While the embodiment illustrated shows the rods 92 in a generally vertical installation and the rods 94 in a generally horizontal installation, the frame 90 is not so limited in installation.

In general, the support frame 90 comprises a lower rod 94A that is greater in length than a middle rod 94B, which is greater in length than an upper rod 94C. First ends of the rods 94A, 94B and 94C are secured to a first rod 92A and second opposing ends of the rods 94A, 94B, and 94C extend beyond the connection with second rod 92B to provide an inclined support surface for securing the solar panel 95 to the framework 90. The rods may be angled with respect to the attachment to the foundation and with respect to the attachment to one another. For example, the rods 94 may be secured across to the rods 92 where the rods 92 and 94 form an angle other than approximately 90° with respect to one another. Further this support frame 90 may be configured to support anywhere from one to ten solar panels 95.

Figure 8A:
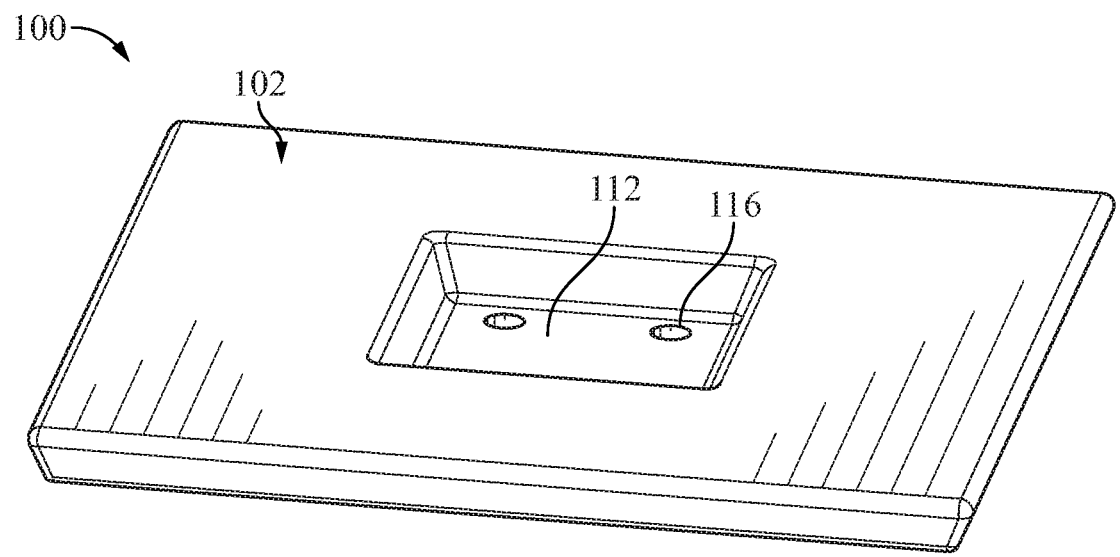
FIG. 8A is a top perspective view of a ballast plate for the foundation.
Figure 8B:
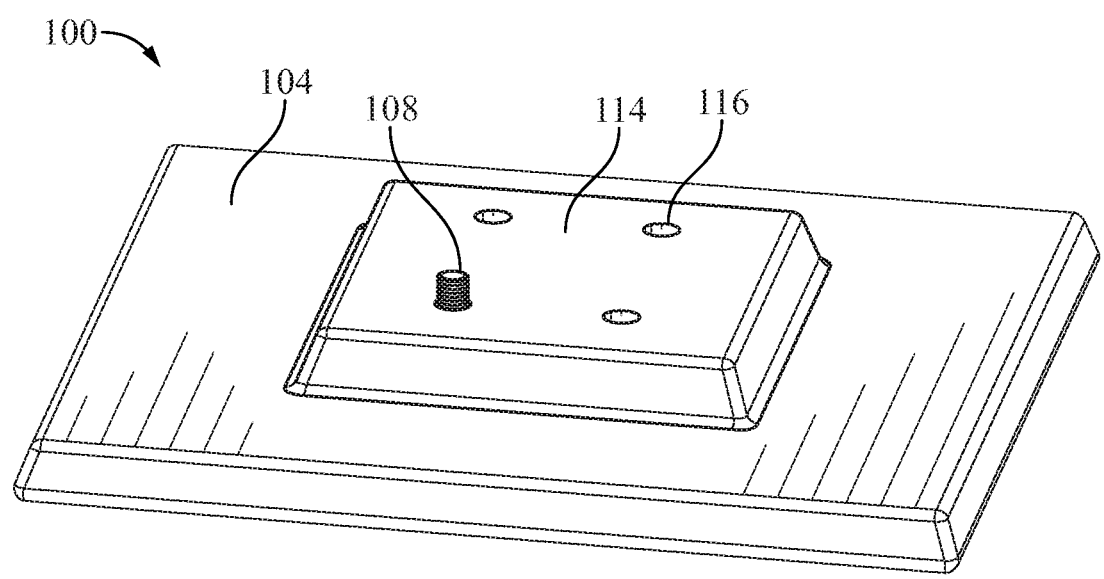
FIG. 8B is a bottom perspective view of a ballast plate for the foundation.

Referring back to FIG. 2, the foundation 10 can then be leveled and secured on a ground surface of varying terrain with ballast. As illustrated in FIGS. 8A and 8B, the ballast 14 comprises one or more ballast plates 100 secured to each leg 20 of the foundation 10 via connection with the ballast support adapter 50. In one embodiment, the ballast plates 100 can be pre-cast ballast plates 100 having a first surface 102 and a corresponding opposing surface 104 that allow each plate 100 to be secured to either the upper plate 56 or lower plate 52 of the ballast support adapter 50. The plates 100 are configured such that the plates 100 can be secured to the foundation 10 in both a position on top of the ballast support adapter 50 or a position below the ballast support adapter 50. This allows the same plate 100 to be used for leveling the foundation 10 and providing counterweight for stabilizing the monopole tower 12.

The plates 100 each include one or more apertures 116 configured to receive a securing mechanism 108 for mounting one or more plates 100 to the ballast support adapter 50. The plates 100 are configured to be stackable such that one or a plurality of plates 100 can be secured on top of the support adapter 50 and/or below the support adapter 50. A threaded engagement utilizing bolts 108 having varying lengths depending on the number of plates secured to the support adapter 50 can also be provided. Bolts 108 and corresponding washers and nuts 110 are typically utilized to secure the one or more ballast plates 100 to the top or bottom support plate 58 or 60, respectively.

Figure 9:
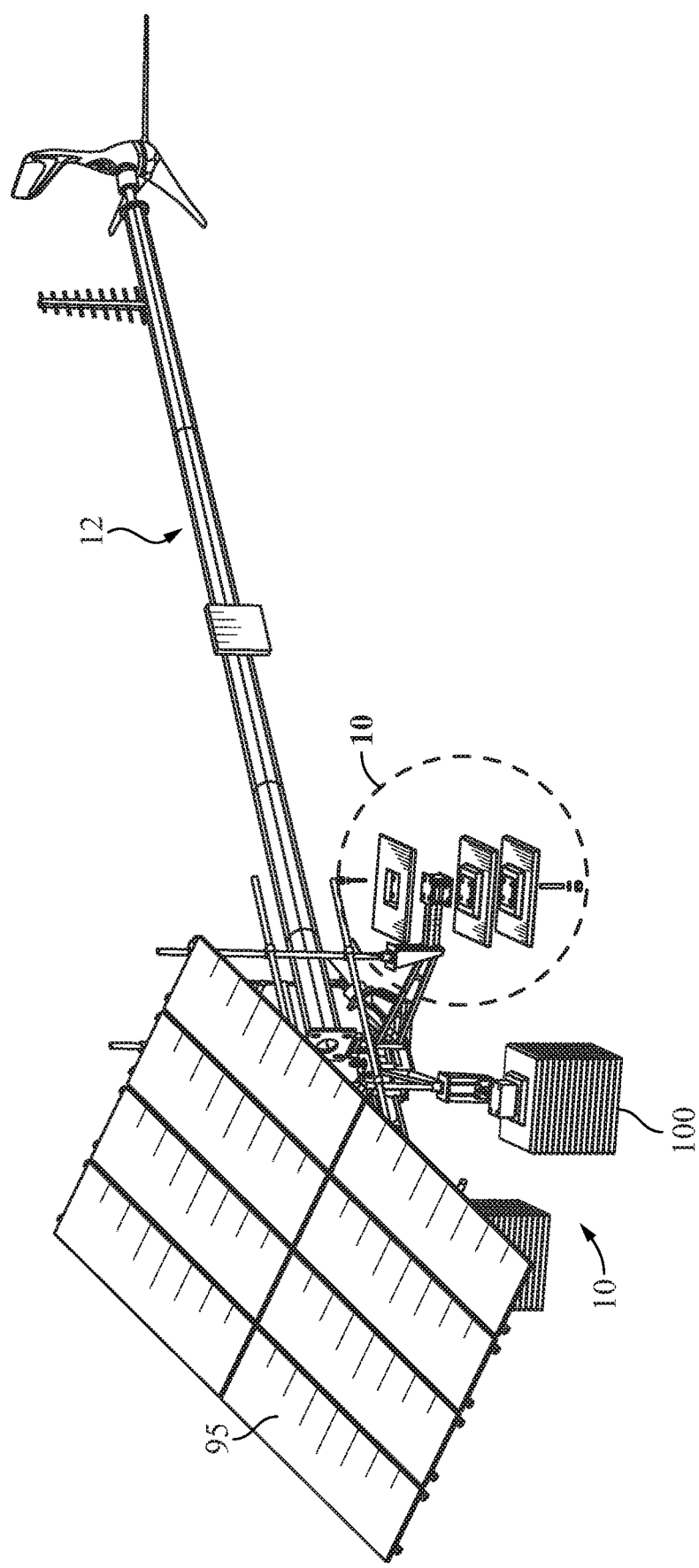
FIG. 9 is a perspective view of the foundation and a monopole tower in a lowered configuration.
Figure 10:
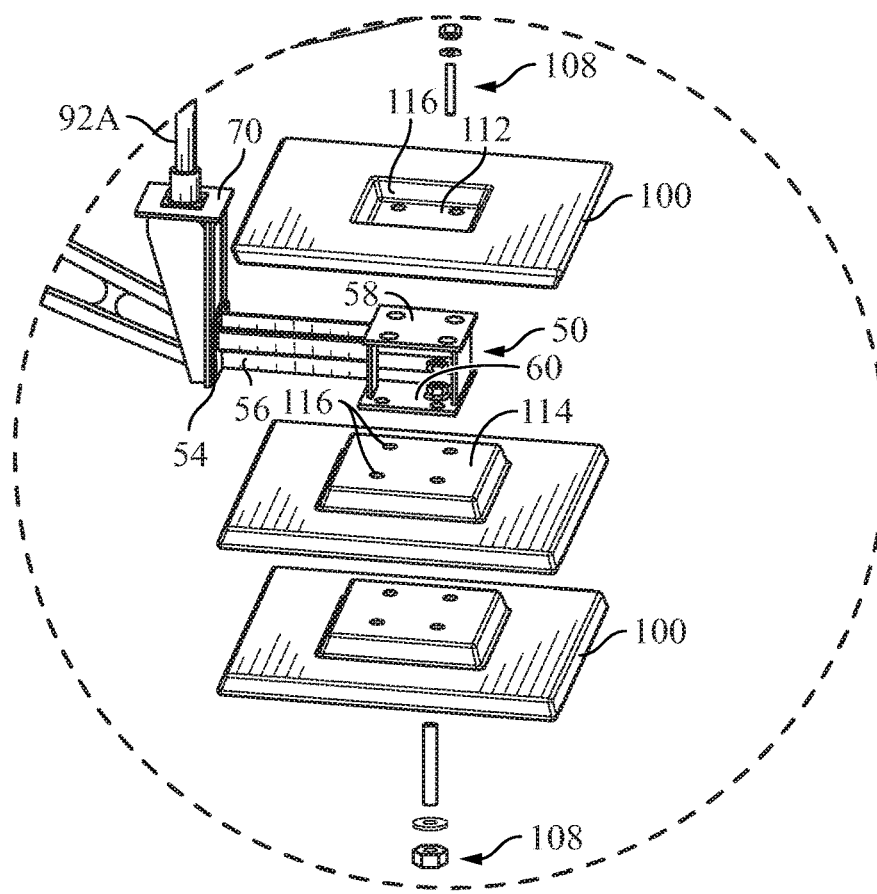
FIG. 10 is a partial exploded view of the ballast plates and support adapter.

In the embodiment illustrated herein, each ballast plate 100 is generally rectangular in shape, although other geometric shapes are contemplated. The first surface 102 of each plate has a recessed surface portion 112 wherein one or more apertures 116 are located therein. Correspondingly, the second surface 104 of the plate is the opposing surface of the plate and includes a protruding surface area 114 corresponding to the recessed surface area on the other side of the plate 100. Thus, the plates 100 are configured to be stackable as the protruding surface area 114 of one plate rests in the recessed surface area 112 of an adjacent plate. This also allows the plates 100 to be used in a first orientation, for example, with the recessed surface area 112 facing upwardly and outwardly when the plate 100 is mounted to the top support plate 58 of the ballast support adapter 50. A reverse side of the plate 100 allows the plate 100 to be used in a second orientation, for example, wherein the protrusion 114 is facing upwardly and inwardly when the plate 100 is secured to the bottom support plate 60. The second surface 114 is the surface contacting the top or bottom plate for securing the plate 100 to the ballast support arm 50, and the plates 100 are attached either above or below the ballast support arm 50 for leveling the foundation and supporting the monopole tower 6 in the upright position concurrently. A method of mounting of the ballast plates 100 onto the foundation 10 is illustrated in FIGS. 9 and 10.

The ballast plates 100 can be utilized both as counter weights and also to adjust the height of the legs 20 while also providing support and stability to the foundation 10 and monopole 12. The ballast plates 100 are coupled to the ballast support adapter 50 where the weight of the ballast plates 100 retains the foundation 10 in the selected position and resists the monopole 12 and the attached equipment from toppling, such as due to wind loading. The foundation 10 is configured to support stackable ballast allowing the monopole tower to be leveled on a slope of us to about 20 degrees.

In some embodiments, batteries 120 can also be utilized for stabilizing the monopole tower 12. Additionally, or alternatively, the batteries 120 can be positioned on top of an installed ballast plate 100 and operably connected to equipment supported by the foundation 10 or monopole tower 12. For example, the batteries 120 can provide electricity to a remote site as the electricity can be captured by solar and/or wind driven generation and stored in the batteries 120.

For example, one or more solar panels 95 may be operably mounted to and/or supported by the foundation 10. In one embodiment, one or more 2.8 kW solar panels 95 are installed on the frame 90 around the foundation 10. The solar panel 95 is electrically connected to the battery for storage of the energy captured. While 2.8 kW solar panels are illustrated, any lower or higher wattage panel, cell or panel number and physical size is contemplated as the solar panels supported on the foundation are selected based in part on the kilowatt hour (kWh) consumption in the environment where the foundation 10 is installed.

For example, a wind turbine 122 may be operably secured to the monopole tower 12 and electrically connected to the batteries 120 for transferring electricity to the batteries 120 for storage. In the embodiment illustrated, the wind turbine 122 is a small wind turbine, examples including but are not limited to a 1.2 kW wind turbine. Wind turbines of various sizes and capable of generating more or less energy are contemplated and within the scope of this disclosure. The wind turbine 122 is installed at the terminal top end of the monopole tower 12.

A communications module 124 may also be operably secured to the monopole tower 12. The communications module 124 includes one or more antennas 126 and 128. For example, a first and second antenna 126 and 128 are secured at spaced apart locations along a length of the monopole tower 12. The first antenna 126 may be a directional antenna having multiple parallel elements in a line such as half-wave dipoles made of metal rod, commonly referred to as a Yagi antenna and having a frequency in the range of 698-2700 MHz. The second antenna 128 may be a dual band, single port, planar antenna with a frequency range of approximately 1695-2180 MHz. Alternative antennas for purposes of communication are contemplated and are within the scope of this disclosure.

Figure 11:
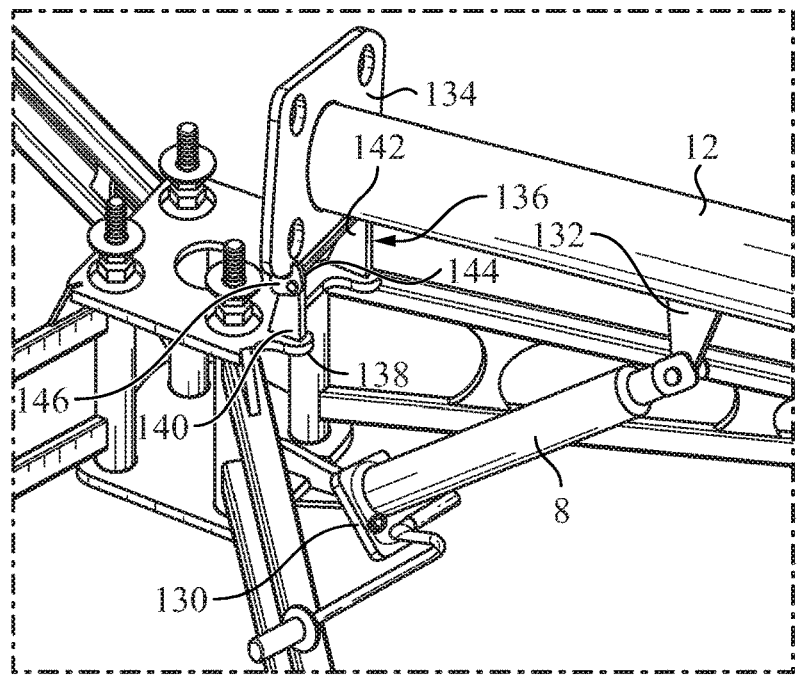
FIG. 11 is a partial perspective view of a jack attached to the foundation for raising and lowering the monopole tower.

Referring back to FIGS. 1-4 and as illustrated in further detail in FIG. 11, raising and lowering the monopole 12 can be done with a jack 8 that attaches to a bottom mounting bracket 130 extending from the lower plate 21 and a mounting bracket 132 attached to the monopole tower 12. The mounting bracket 130 is attached to the lower plate 21 with a threaded engagement of bolts 131 and nuts 133. A mechanical screw type jack 8 is illustrated. However, any lifting mechanism capable of raising and lowering the monopole tower 12 and the attached equipment can be utilized, including but not limited to a hydraulic ram.

To raise the monopole tower 12, a plate 134 attached to the bottom end of the monopole tower 12, is secured to a mounting bracket 136 attached to the upper plate 19. The mounting bracket 136 includes a lower portion 138 having two spaced apart lower members 140 and 142 having aligned through bores proximate an upper end. An upper portion 144 having spaced apart upper members 146 are fixedly attached to the plate 134. A pivot pin is secured through the aligned apertures to pivotally attach the lower and upper portions 138 and 144, respectively such that the monopole tower 12 can be pivotally raised and lowered relative to the foundation 10, as illustrated in FIGS. 1 and 2.

The foundation 10 provides a compact modular design that can be easily transported and constructed on site. The foundation 10 has numerous securing and leveling features which allow the foundation 10 to be secured in several ways such that the foundation 10 can be utilized on almost any surface or terrain. Finally, the foundation 10 is safe, efficient and easily constructed piece of equipment that can be utilized for raising and lowering the monopole tower 6 without the need of additional equipment or more than one person.

Although the present invention has been described with reference to preferred embodiments, workers skilled in the art will recognize that changes may be made in form and detail without departing from the spirit and scope of the invention.

The invention claimed is:

1. A monopole foundation comprising:
a central portion having a platform for pivotally supporting a monopole thereon;
a plurality of legs, each leg secured to and extending from the central portion wherein each leg includes a proximal end and a distal end;
a plurality of arms, wherein each arm is attached to the distal end of each leg and wherein each arm of the plurality of arms is configured to be attached to each leg in a plurality of spaced apart vertical positions such that a location of each arm of the plurality of arms is adjustable vertically relative to each lee of the plurality of legs to accommodate an uneven surface; and
a plurality of ballast plates, wherein each arm of the plurality of arms is configured to engage and retain the plurality of ballast plates above and below each arm, wherein the plurality of ballast plates are positioned below one or more arm of the plurality of arms, the plurality of ballast plates below the arm are secured to the arm of the plurality of arms with a securing mechanism such that the plurality of ballast plates below and above each arm of the plurality of arms provides ballast and stability to the monopole foundation and retain the monopole foundation in a level position on a ground surface.

2. The monopole foundation of claim 1, wherein each arm of the plurality of arms comprises a first ballast mounting plate and a second ballast mounting plate spaced apart and supported by the arm and wherein the first and second mounting plates each comprise at least one ballast securing aperture.

3. The monopole foundation of claim 2, wherein the securing mechanism comprises a bolt positioned through apertures in the plurality of ballast plates and in the at least one ballast securing aperture in one of the first and second ballast mounting plates, and the bolt is secured with a threaded nut.

4. The monopole foundation of claim 1, wherein the plurality of ballast plates comprises a plurality of stackable ballast plates, wherein each stackable ballast plate of the plurality of ballast plates has a first surface and a second surface on a reverse side of the stackable ballast plate such that the first surface of a first stackable ballast plate nests within the second surface of a second stackable ballast plate for substantially flush stacking of two of the plurality of ballast plates.

5. The monopole foundation of claim 1, wherein the monopole comprises a plurality of sections configured to be secured together for on-site assembly of the monopole.

6. The monopole foundation of claim 1, and further comprising a frame secured to two legs, wherein the frame is configured to support one or more solar panels and wherein the one or more solar panels are electrically connected to one or more batteries supported on the monopole foundation for storing electricity captured by the solar panels.

7. The monopole foundation of claim 6, and further comprising a plurality of mounting brackets, where each mounting bracket of the plurality of mounting brackets is positioned between each leg and each arm of the plurality of legs and the plurality of arms, wherein the frame is secured to the plurality of mounting brackets.

8. The monopole foundation of claim 1, and further comprising a plurality of mounting brackets, wherein one mounting bracket is secured to the distal end of each leg and each mounting bracket in the plurality of mounting brackets comprises a plurality of spaced apart apertures for securing each arm to each leg in a plurality positions to adjust each arm vertically relative to each leg of the plurality of legs.

9. The monopole foundation of claim 1, wherein the monopole foundation further supports one or more batteries for storing electricity captured from one or more renewable energy sources operably coupled to the monopole or monopole foundation.

10. The monopole foundation of claim 1, and further comprising a communications system having one or more antennas secured to the monopole.

11. The monopole foundation of claim 1, and further comprising a wind turbine operably secured to the monopole and wherein the wind turbine is electrically connected to one or more batteries supported on the monopole foundation for storing electricity generated by the wind turbine.

12. A device configured to retain equipment in a leveled and elevated position, the device comprising:
    a foundation comprising:
        a central portion;
        a plurality of legs, each leg secured to and extending from the central portion;
        wherein each leg includes a proximal end and a distal end;
    a plurality of mounting brackets, each mounting bracket of the plurality of mounting brackets secure to the distal end of each leg of the plurality of legs, wherein each mounting bracket includes a plurality of sets of apertures that are spaced vertically along a height of each mounting bracket; and
    a plurality of arms, wherein each arm is attached to the distal end of each leg utilizing a mounting bracket of the plurality of mounting brackets, wherein each arm of the plurality of arms is configured to be attached to each mounting bracket in a plurality of spaced apart vertical positions utilizing a securing mechanism positioned through one or more sets of apertures of the plurality of apertures in each mounting bracket such that a location of each arm of the plurality of arms is adjustable vertically relative to each leg of the plurality of legs where the arms are substantially horizontal to accommodate an uneven surface; and
    a platform pivotally attached to the central portion wherein the platform is configured to move from a vertical position to a horizontal position; and
    a monopole tower having a bottom end and a top end wherein the bottom end of the monopole tower attaches to the platform and the top end is configured to retain the equipment; and
    a plurality of ballast plates disposed above and below each arm of the plurality of arms.

13. The device of claim 12 wherein the equipment comprises one or more of a renewable energy capture device and a communications system comprising one or more antennas.

14. The device of claim 12 and wherein the plurality of arms and the plurality of ballast plates comprise:
    an upper ballast support plate and a lower ballast support plate, each of the upper and lower support plates having a plurality of securing apertures therein; and
    a tubular arm extending from the mounting plate to the upper and lower ballast support plates.

15. The device of claim 12 and further comprising a plurality of ballast plates wherein the ballast plates are stackable.

16. The device of claim 15 wherein each ballast plate comprises:
    a first surface;
    a second surface on a reverse side of each ballast plate;
    one or more securing apertures; and
    wherein the first surface of a first plate nests within the second surface of a second plate for stacking of two or more ballast plates, wherein the plurality of ballast plates is configured to be mechanically secured to each of arm of the plurality of arms at locations above and below each arm.

17. The device of claim 12 and further comprising a frame mounted to the plurality of mounting brackets, wherein the frame is configured to operably support one or more solar panels thereon and electrically connected to one or more batteries.

18. The device of claim 12 and further comprising a jack having a top end attached to the platform and a bottom end attached to the central portion wherein the jack is manipulated to pivotally move the platform from the vertical position to the horizontal position.

19. The device of claim 12 wherein the monopole tower comprises a plurality of sections such that the monopole tower a multi-section assembly.

* * * * *